(12) United States Patent
Peschina

(10) Patent No.: US 12,381,460 B2
(45) Date of Patent: Aug. 5, 2025

(54) WELDING MACHINE, PRODUCTION SYSTEM AND METHOD FOR WELDING FREE ENDS OF BAR CONDUCTORS

(71) Applicant: FELSOMAT GmbH & Co. KG, Koenigsbach-Stein (DE)

(72) Inventor: Juergen Peschina, Knittlingen (DE)

(73) Assignee: FELSOMAT GmbH & Co. KG, Koenigsbach-Stein (DE)

( * ) Notice: Subject to any disclaimer, the term of this patent is extended or adjusted under 35 U.S.C. 154(b) by 754 days.

(21) Appl. No.: 17/448,883

(22) Filed: Sep. 25, 2021

(65) Prior Publication Data

US 2022/0014078 A1   Jan. 13, 2022

Related U.S. Application Data

(63) Continuation of application No. PCT/EP2020/057361, filed on Mar. 18, 2020.

(30) Foreign Application Priority Data

Mar. 29, 2019   (DE) ...................... 10 2019 108 351.6

(51) Int. Cl.
*H02K 15/00*   (2025.01)
*B23K 26/16*   (2006.01)
(Continued)

(52) U.S. Cl.
CPC ............. *H02K 15/35* (2025.01); *B23K 26/16* (2013.01); *B23K 26/21* (2015.10);
(Continued)

(58) Field of Classification Search
CPC .. H02K 15/0081; H02K 15/02; H02K 15/028; H02K 15/0414; H02K 15/0421;
(Continued)

(56) References Cited

U.S. PATENT DOCUMENTS 6,490,779 B1   12/2002   Tokizawa et al.
9,520,762 B2   12/2016   Guercioni
(Continued)

FOREIGN PATENT DOCUMENTS

CN   1695285 A   * 11/2005   ............. B23K 26/26
CN   103314508 A   9/2013
(Continued)

*Primary Examiner* — Hung D Nguyen
(74) *Attorney, Agent, or Firm* — Orbit IP, LLP; Marc G. Martino

(57) ABSTRACT

A welding machine for welding free ends of bar conductors of a stator of an electrical machine, in particular an electric motor, includes a support structure for directly or indirectly fastening the stator. The support structure has a welding mask that can be opened and closed. The welding device is in particular a laser welding device. The welding device is arranged above the support structure. The support structure can be moved between a closed position and a loading position. A first side of the welding mask faces the welding device in the welding position and faces downward in the loading position. The welding machine allows free ends of bar conductors of a stator of an electrical machine to be welded while at the same time the stator is protected against contamination.

16 Claims, 8 Drawing Sheets

(51) Int. Cl.
  *B23K 26/21* (2014.01)
  *B23K 37/02* (2006.01)
  *B23K 37/04* (2006.01)
  *B23K 37/047* (2006.01)
  *B24C 1/00* (2006.01)
  *H02K 15/35* (2025.01)
  *B23K 101/36* (2006.01)
  *B23K 103/12* (2006.01)

(52) U.S. Cl.
  CPC ...... *B23K 37/0229* (2013.01); *B23K 37/0443* (2013.01); *B23K 37/0452* (2013.01); *B23K 37/047* (2013.01); *B24C 1/003* (2013.01); *B23K 2101/36* (2018.08); *B23K 2103/12* (2018.08)

(58) Field of Classification Search
  CPC ........ H02K 15/063; H02K 15/08; H02K 1/28; B23K 2101/001; B23K 2101/006; B23K 2101/36; B23K 2101/38; B23K 37/04; B23K 37/0435; B23K 37/0452; B23K 37/0461; B23K 37/047; B23K 37/06; B23Q 3/02
  See application file for complete search history.

(56) References Cited

U.S. PATENT DOCUMENTS

| | | |
|---|---|---|
| 9,667,125 B2 | 5/2017 | Nishiyama et al. |
| 10,239,154 B2 | 3/2019 | Ciampolini et al. |
| 11,128,205 B2 | 9/2021 | Ponzio et al. |
| 2012/0181890 A1 | 7/2012 | Kleber et al. |
| 2013/0056447 A1* | 3/2013 | Perry ..................... B23K 11/31 219/121.11 |
| 2014/0007415 A1 | 1/2014 | Corbinelli et al. |
| 2016/0303686 A1 | 10/2016 | Ciampolini et al. |
| 2020/0153319 A1 | 5/2020 | Reiser et al. |
| 2020/0269349 A1* | 8/2020 | Nogami ............. B23K 26/0884 |
| 2021/0104940 A1* | 4/2021 | Ponzio .................. B21D 39/03 |

FOREIGN PATENT DOCUMENTS

| | | |
|---|---|---|
| CN | 104167877 A | 11/2014 |
| CN | 106041303 A | 10/2016 |
| CN | 106181208 A | 12/2016 |
| CN | 106230198 A | 12/2016 |
| CN | 206764217 U | 12/2017 |
| CN | 107717288 A | 2/2018 |
| DE | 195 12 552 A1 | 10/1996 |
| DE | 199 12 985 C1 | 7/2000 |
| DE | 20 2011 051331 U1 | 11/2011 |
| DE | 10 2015 206237 A1 | 10/2016 |
| DE | 10 2016 210 927 A1 | 12/2017 |
| DE | 10 2018 103 100 A1 | 1/2019 |
| EP | 1 043 828 B1 | 9/2009 |
| FR | 3 020 201 A1 | 10/2015 |
| JP | 2004122175 A * | 4/2004 |
| KR | 94-0001999 A | 2/1994 |
| WO | 2018 185620 A1 | 10/2018 |
| WO | 2019 020765 A1 | 1/2019 |

* cited by examiner

WELDING MACHINE, PRODUCTION SYSTEM AND METHOD FOR WELDING FREE ENDS OF BAR CONDUCTORS

CROSS-REFERENCE TO RELATED APPLICATIONS

This continuation application claims priority to PCT/EP2020/057361 filed on Mar. 18, 2020 which has published as WO 2020/200777 A1 and also the German application number 10 2019 108 351.6 filed on Mar. 29, 2019, the entire contents of which are fully incorporated herein with these references.

DESCRIPTION

Field of the Invention

The invention concerns a welding machine for welding free ends of bar conductors of a stator of an electrical machine, in particular an electric motor. The invention furthermore concerns a production system comprising such a welding machine. The invention furthermore concerns a method for welding free ends of bar conductors of a stator of an electrical machine, in particular an electric motor.

Background of the Invention

Electrical machines, e.g. electric motors, commonly have a stator with a so-called coil winding. Traditionally, the coil winding is produced by winding a wire. Such winding processes are however technically very complex and subject to technical restrictions. Also, the filling ratio (proportion of surface area of the wire in an over-wound cross-section) in wound coils is limited.

Coils of stators of electrical machines may alternatively also be formed by interconnected bar conductors which are inserted into a base body of the stator. In particular in the sector of motor vehicles which can be (or are) driven by an electric motor, electric motors with stators with bar conductors are increasingly used. In order to connect two bar conductors together, their free ends are typically welded together. However, often when welding the free ends of the bar conductors, weld spatter occurs which can contaminate the stator and a welding device.

SUMMARY OF THE INVENTION

Object of the Invention

The object of the invention is to indicate a welding machine and a welding method which allow welding of free ends of bar conductors of a stator of an electrical machine, wherein the stator is protected from contamination.

BRIEF DESCRIPTION OF THE INVENTION

This object is achieved by a welding machine for welding free ends of bar conductors of a stator of an electrical machine, in particular an electric motor, comprising: a support structure for directly or indirectly fixing the stator, having a welding mask which can be opened and closed; a welding device, in particular a laser welding device; wherein the welding device is arranged above the support structure, and wherein the support structure can be moved between a welding position and a loading position, wherein a first side of the welding mask is oriented towards the welding device in the welding position and is oriented downward in the loading position.

The welding machine is a machine (apparatus) which serves for welding the free ends of bar conductors of a stator. The stator may be fixed directly (immediately) to the support structure. Alternatively, the stator may be fixed to the support structure indirectly (mediately), e.g. by means of a holder separate from the support structure. By means of the holder, the stator can be fixed to the support structure and removed from the support structure particularly quickly.

In principle, the stator can be fixed to the support structure such that a base body, typically comprising a metal sheet package, of the stator is arranged on a second side of the welding mask (facing away from the first side). Then, viewed onto the first side, the base body is concealed by the welding mask so it is protected from weld spatter. The bar conductors of a stator fixed to the support structure protrude through the welding mask. The free ends of the bar conductors to be welded are arranged on the first side of the welding mask.

The welding mask can be opened and closed. In order to arrange the stator on the support structure or remove it from the support structure, the welding mask is, as a principle, opened. During welding of the free ends, the welding mask is, as a principle, closed.

In the closed state of the welding mask, intermediate gaps between the bar conductors are at least largely and preferably completely closed. So when the welding mask is closed, no weld spatter or other contamination can be deposited on the parts arranged on the other side of (behind) the first side of the welding mask, in particular on the base body of the stator.

The welding mask typically has a radially outer, substantially annular cover element, a radially inner, approximately circular cover element, and movable intermediate elements. In the closed state, the intermediate elements engage between the bar conductors. Thus the intermediate spaces between the bar conductors, and the regions radially outside and/or radially inside the bar conductors, can be covered with relatively simple mechanical means.

To weld the free ends, the support structure is brought into the welding position. In the welding position, the first side of the welding mask and the free ends of the bar conductors to be welded point upward. The welding device of the welding machine is arranged above the support structure. The welding device is preferably configured as a laser welding device. Laser welding allows the free ends to be welded rapidly and precisely. Since the welding device is situated above the free ends, the risk of weld spatter being deposited on the welding device, e.g. on an optic of the laser welding device, is low. At the same time, the (closed) welding mask prevents weld spatter or other contamination from being able to reach parts below the welding mask, in particular the base body of the stator.

To remove the stator from the support structure after welding, the support structure is brought into the loading position. The loading position could also be called the feed position. In the loading position, the first side and also the (welded) ends of the bar conductors point downward. In order to remove the stator from the support structure, the welding mask is opened. Since the first side, on which any weld spatter and/or other contamination may have been deposited during the welding process, points downward on opening, dirt particles cannot fall onto the stator.

The bar conductors may be configured as so-called hairpins in which two substantially straight portions are connected by a bent portion. Thereby, one free end to be welded is formed on each of the straight portions. The straight portions are inserted in the base body of the stator. Alternatively, free ends of the bar conductors may be welded together on both sides of the base body.

The bar conductors may have a rectangular cross-section. Such bar conductors can achieve a particularly high filling ratio of the stator. In other words, the bar conductors allow as much conductor material (typically copper) as possible to be introduced into openings in the base body of the stator. The bar conductors are typically arranged in several concentric rings (layers).

The welding machine is particularly suitable for the production of stators for drive motors of motor vehicles.

The welding machine is preferably used in the context of a welding process according to the invention as described below. In particular, the welding machine may be configured for performing a method according to the invention as described below.

Preferred Embodiments of the Invention

In an advantageous embodiment, it is provided that the welding mask is configured to clamp the free ends of the bar conductors in closed state. This fixes the free ends so that they cannot move during welding. The free ends may then be welded particularly precisely.

In a particularly preferred embodiment, it is provided that the welding mask has movable fingers for engaging between the bar conductors. The movable fingers may be inserted between the bar conductors, typically in a radial direction, in order to close the welding mask. To open the welding mask, the fingers are retracted, again typically in the radial direction. By means of the fingers, the necessary coverage of the intermediate gaps between the bar conductors can be achieved with little mechanical complexity. Furthermore, the fingers may be configured for clamping the bar conductors.

Another particularly preferred embodiment of the welding machine is characterized in that the welding machine furthermore has a cleaning device for cleaning the welding mask, in particular the first side of the welding mask. By means of the cleaning device, any weld spatter and/or other dirt can be removed from the welding mask and preferably also from the welded ends of the bar conductors. By cleaning the welding mask, the risk of contamination of the stator may be further reduced. Also, by cleaning the welding mask, dirt particles can be prevented from passing between moving parts of the welding mask and becoming stuck there.

Preferably, the cleaning device is arranged below the support structure. During cleaning, released dirt particles—such as in the form of detached weld spatter—can then fall down away from the welding mask.

It may be provided that the cleaning device is configured for cleaning by blowing, scraping, brushing and/or blasting, in particular $CO_2$ snow blasting. It has been found that these cleaning methods can achieve a rapid and thorough cleaning of the welding mask and where applicable the free ends of the bar conductors.

It may be provided that the welding machine has a frame, in particular a rectangular frame, on which the support structure is mounted via a swing bridge. The swing bridge allows, in simple fashion, the support structure to pivot between the welding position and the loading position. Furthermore, the welding device may be fixed to the frame. This promotes a compact construction of the machine. Also, the common frame may improve the precision of alignment of the support structure and welding device relative to one another.

An advantageous embodiment of the welding machine is characterized in that the support structure is rotatable about a horizontal pivot axis. The horizontal arrangement of the pivot axis means that very little installation space is required for moving the support structure between the welding position and the loading position. Furthermore, during pivoting of the support structure about a horizontal pivot axis, it is ensured that any dirt particles which may be present fall down from the welding mask into a narrowly limited region.

The welding machine typically allows a relative movement between the welding device and the support structure in at least one, preferably two horizontal directions, and typically also in a vertical direction. For this, the welding device and/or the support structure may be movable.

In a welding machine with a horizontal pivot axis for the support structure, it may furthermore be provided that the support structure is rotatable about a rotational axis oriented perpendicularly to the pivot axis. By rotation about the rotational axis, individual pairs of free ends of bar conductors to be welded can easily be oriented relative to the welding device for the welding process. The welding device is here initially positioned in a suitable radial position with respect to the stator. Then by rotating the support structure about the rotational axis, the pairs of free ends of bar conductors are arranged below the welding device for welding. The rotational axis may also rotate about the pivot axis on pivoting of the support structure. Typically, the support structure is rotatably mounted inside a swivel bridge.

An advantageous embodiment of the welding machine is characterized in that the welding device can travel in a vertical direction and at least one horizontal direction, preferably two horizontal directions, relative to the support structure. In this way, the welding device can easily be suitably positioned for welding the free ends. The support structure is typically fixed to a frame of the welding machine in the vertical direction. The support structure is also often immovable relative to the frame in the horizontal direction. In order to provide the movability of the welding device relative to the support structure, the welding device can then accordingly travel in the vertical and/or at least one horizontal direction.

Production System According to the Invention:

The present invention furthermore includes a production system comprising a welding machine according to the invention as described above and a holder, in particular a clamping holder, by means of which the stator can be fixed to the support structure. By means of the holder, the stator can be fixed to the support structure and removed from the support structure particularly quickly. For fixing to the support structure, the stator is typically provided in a state held in the holder. The holder together with the stator may then be fixed to the support structure or removed from the support structure. The holder may also simplify handling of the stator in the further course of production.

Preferably, it is provided that the holder can be connected to the support structure via a centering clamping system, in particular a zero point clamping system. In this way, the stator can be fixed to the support structure particularly precisely.

Welding Method According to the Invention:

The present invention also includes a method for welding free ends of bar conductors of a stator of an electrical machine, in particular an electric motor, by means of a welding machine having a support structure with a welding mask which can be opened and closed. The welding machine is preferably a welding machine according to the invention as described above. The method comprises the steps:

a) providing the stator fixed to the support structure, wherein a first side of the welding mask and the free ends of the bar conductors point upward, and wherein the welding mask is closed,
b) welding the free ends,
c) turning the support structure so that the first side and the ends of the bar conductors point downward,
d) opening the welding mask and removing the stator from the support structure.

Step a) achieves that the stator and the welding mask are in a configuration suitable for welding. In particular, the orientation of the support structure may correspond to the above-mentioned welding position, wherein the welding device is arranged above the support structure or stator. For fixing the stator to the support structure, advantageously a holder of a production system according to the invention as described above may be used. Immediately following step a), the free ends may be welded in step b). The closed welding mask here prevents any weld spatter or other dirt from being deposited on the stator.

After welding of the free ends, the support structure is turned in step c). The resulting orientation of the support structure may in particular correspond to the loading position described above. On opening of the welding mask with the first side pointing downward and the ends of the bar conductors pointing downward, no dirt particles can fall onto the stator. Also, if dirt particles become detached from the welding mask or from the ends of the bar conductors on removal of the stator from the support structure, these do not fall onto the stator but fall down away from the stator. The stator is typically removed from the support structure upward in step d).

The electrical machine with the stator may be a drive motor for driving an, in particular (mild) hybrid, motor vehicle. The electrical machine may in particular be a starter-generator. The electrical machine may for example have a nominal power of at least 10 kW and at most 15 kW, e.g. 12 kW.

Preferably, step a) comprises the following part steps:
a1) fixing the stator to the support structure, wherein the first side of the welding mask and the free ends of the bar conductors point downward,
a2) closing the welding mask,
a3) turning the support structure so that the first side and the free ends of the bar conductors point upward.

Because the stator is fixed to the support structure with the first side of the welding mask pointing downward, it is ensured that when the free ends of the bar conductors are passed through the welding mask, no dirt particles which may have remained on the welding mask fall onto the stator. Also, the support structure may remain in the loading position between removal of a first stator and attachment of a second stator. This accelerates the production of several stators.

Steps a2) and a3) achieve the configuration of the welding mask and support structure suitable for welding the free ends.

Typically, part steps a1) to a3) are carried out in the order given. Part step a2) may alternatively also be carried out temporally overlapping with part step a1) and/or part step a3). Furthermore, part step a2) may take place at least partially, in particular completely, after part step a3).

The method may comprise the following further step:
e) cleaning the first side of the welding mask, and preferably also the ends of the bar conductors, in the position of the support structure achieved in step c) with downwardly pointing first side. In other words, to carry out the cleaning, the support structure remains in the (loading) position established in step c). This ensures that on cleaning, dirt particles which become detached from the welding mask and the ends of the bar conductors can fall away downward. Cleaning preferably takes place by blowing, scraping, brushing and/or blasting, in particular $CO_2$ snow blasting.

If only the first side of the welding mask is cleaned, step e) may be carried out before or preferably after step d). If the ends of the bar conductors are also cleaned, step e) is carried out before step d).

Further advantages of the invention arise from the description and the drawing. According to the invention, the above-mentioned features and further features to be presented may be used individually or in multiples in arbitrary combinations. The embodiments shown and described should not be understood as a conclusive list but rather have an exemplary character for presentation of the invention.

BRIEF DESCRIPTION OF THE DRAWINGS

The invention is shown in the drawing and explained in more detail with reference to exemplary embodiments. The drawings show.

DETAILED DESCRIPTION ON THE PREFERRED EMBODIMENTS

Figure 1:
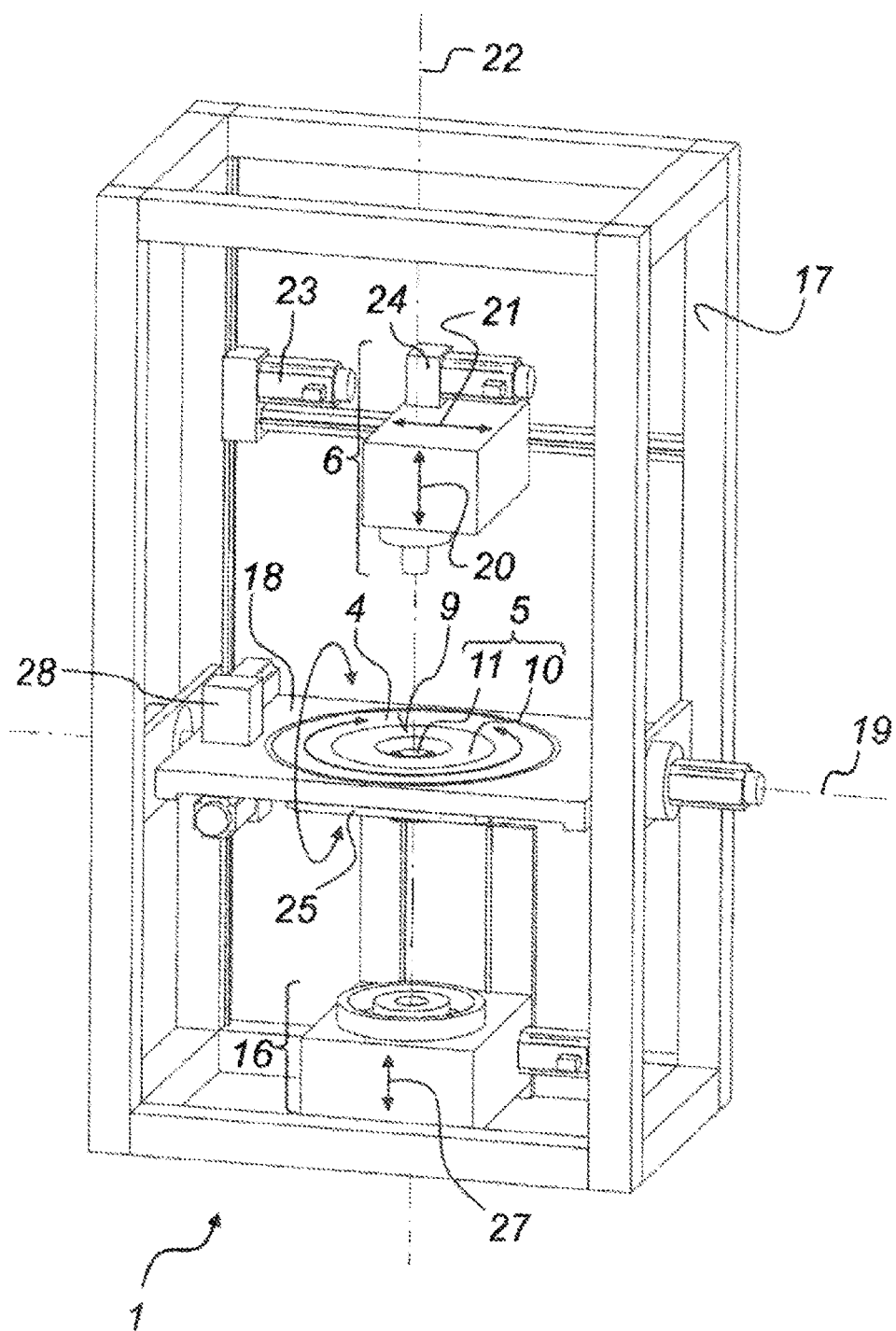
FIG. 1 a schematic, perspective view of a welding machine with a support structure for receiving a stator, which support structure is pivotable via a swivel bridge between a welding position and a loading position and comprises a welding mask which can be opened and closed for covering the stator, wherein the support structure is in the welding position.

FIG. 1 shows a welding machine 1. The welding machine 1 serves for welding free ends 2a of bar conductors 2 of a stator 3, see FIG. 2d. The welding machine 1 has a support structure 4. The stator 3 can be fixed to the support structure 4. The support structure 4 has a welding mask 5 which can be opened and closed.

The welding machine 1 furthermore comprises a welding device 6, here a laser welding device. The welding device 6 is arranged above the support structure 5.

The welding machine 1 here comprises a frame 17. Viewed from the front, the frame 17 has a rectangular shape. The welding device 6 can be moved relative to the frame 17 in a vertical direction 20 and a horizontal direction 21. For this, a vertical drive 23 is provided for motion in the vertical direction 21, and horizontal drive 24 for motion in the horizontal direction 21.

The support structure 4 is mounted on the frame 17 via a swivel bridge 18. The swivel bridge 18 together with the support structure 4 is rotatable with respect to the frame 17 about a pivot axis 19 running horizontally. To pivot the swivel bridge 18 about the pivot axis 19, a pivot drive (not shown in more detail) is provided. The support structure 4 with the welding mask 5 can be moved into a welding position and a loading position by rotation about the horizontal pivot axis 19. FIG. 1 shows the welding position. In the welding position, a first side 9 of the welding mask 5 points towards the welding device 6, i.e. upward. In contrast, the first side 9 of the welding mask 5 points downward in the loading position (not shown in FIG. 1). To transfer the support structure 4 between the welding position and the loading position, the support structure 4 is rotated through 180° about the pivot axis 19.

The support structure 4 is here furthermore rotatable with respect to the swivel bridge 18 about a rotational axis 22 oriented perpendicularly to the pivot axis 19. In the welding position shown, the rotational axis 22 runs vertically.

The welding machine 1 furthermore has a cleaning device 16. The cleaning device 16 serves for cleaning the first side 9 of the welding mask 5 and the ends 2a of the bar conductors 2. For cleaning, the support structure 4 is transferred into the loading position. The cleaning device 16 is here configured for cleaning by $CO_2$ snow blasting. The cleaning device 16 is arranged below the support structure 4. In order to be able to bring the cleaning device 16 up to the welding mask 5 for cleaning, the cleaning device 16 can travel in a vertical direction 27 towards the support structure 4. For pivoting the swivel bridge 18 with the support structure 4 between the welding position and the loading position, the cleaning device 16 is moved downward away from the support structure 4, as shown in FIG. 1.

Figure 2A:
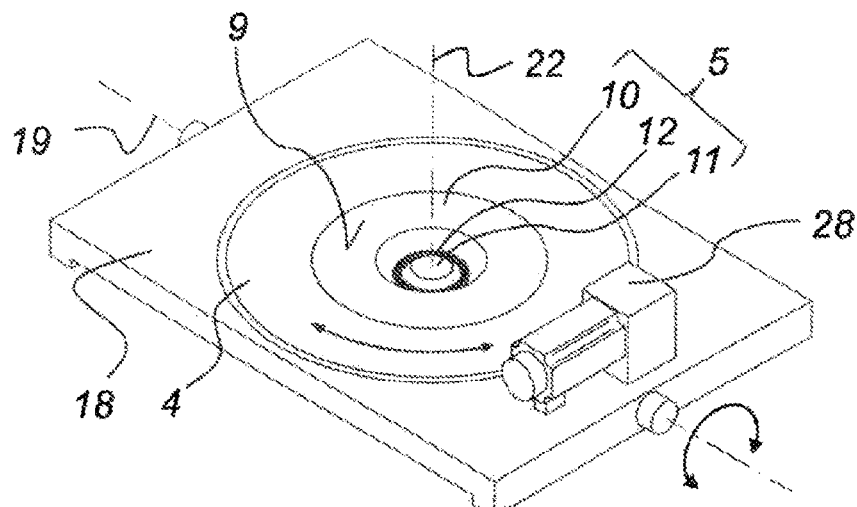
FIG. 2a an exempted, schematic, perspective view of the swivel bridge with support structure of the welding machine from FIG. 1.

FIG. 2a shows the swivel bridge 18 with the support structure 4. A rotational drive 28 is provided for rotating the support structure 4 about the rotational axis 22.

The welding mask 5 comprises a radially outer, annular cover element 10 and a radially inner, circular cover element 11. The welding mask 5 furthermore comprises movable intermediate elements in the form of fingers 12 (not shown in FIG. 2a, but shown in FIGS. 2b and 2c). For opening or closing the welding mask 5, the fingers 12 are respectively retracted radially outwardly or inserted radially inwardly in the radial direction.

Figure 2B:
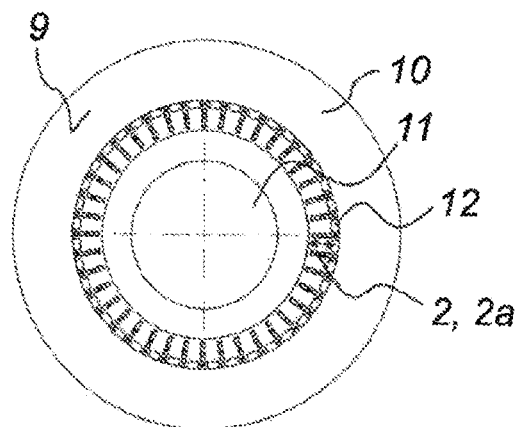
FIG. 2b a schematic top view of the welding mask of the support structure of the welding machine from FIG. 1 in open state.
Figure 2D:
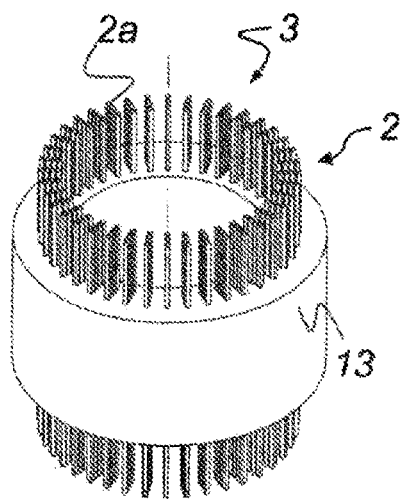
FIG. 2d a schematic perspective view of a stator with bar conductors, the free ends of which can be welded by means of the welding machine from FIG. 1.

FIG. 2b shows the welding mask 5 in open state. The fingers 12 are retracted radially outwardly. Here, the fingers 12 protrude slightly radially inwardly below the radially outer cover element 12. Below the welding mask 5, here below the drawing plane, is a stator 3 (see FIG. 2d) with bar conductors 2. The bar conductors 2 extend through the intermediate space between the radially inner cover element 11 and the radially outer cover element 10. The free ends 2a of the bar conductors 2 to be welded are situated on the first side 9 of the welding mask 5 (here above the drawing plane). In open state of the welding mask 5, the stator 3 can be fixed to the support structure 4 with the welding mask 5 or removed therefrom.

The bar conductors 2 are here arranged in four concentric rings. It is noted that the bar conductors 2 are bent relative to one another before welding, in comparison with the configuration shown in FIG. 2d, so that the free ends 2a of two bar conductors 2 to be welded are brought together (not shown in detail).

Figure 2C:
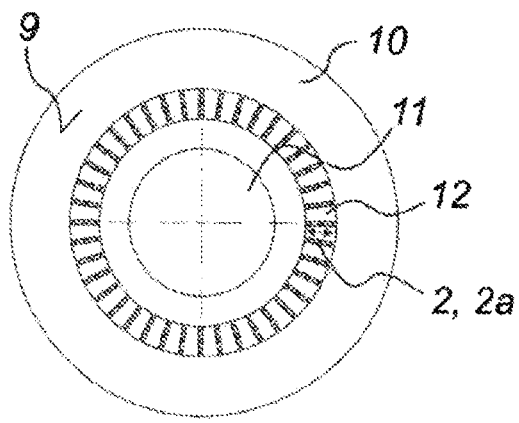
FIG. 2c a schematic top view of the welding mask from FIG. 2b in closed state.

FIG. 2c shows the welding mask 5 in closed state. The fingers 12 are inserted radially inwardly. The bar conductors 2 are clamped between the fingers 12. The fingers 12 each cover the regions between adjacent, radially running rows of free ends 2a of bar conductors 2. In the closed state of the welding mask 5, the free ends 2a of the bar conductors 2 can be welded. The cover elements 10 and 11 and the inwardly protruding fingers 12 prevent weld spatter or other dirt from reaching the stator 3, in particular its base body 13 (see FIG. 2d).

Figure 3:
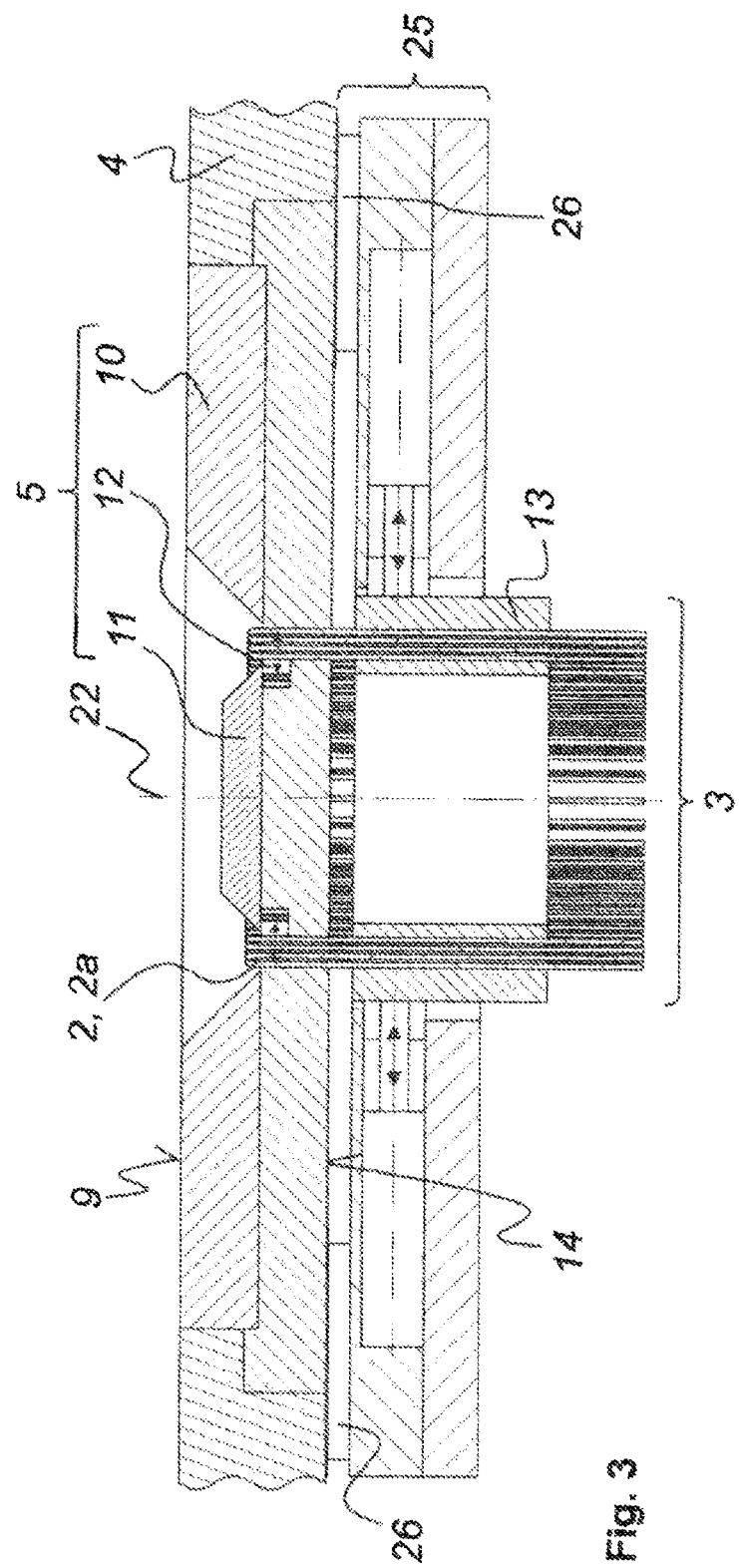
FIG. 3 a schematic cross-section through the support structure of the welding machine from FIG. 1, wherein a stator is fixed to the support structure via a holder.

FIG. 3 shows a cross-section through the support structure 4 with the welding mask 5. The stator 3 is indirectly fixed to the support structure 4 by means of a holder 25. The holder 25 is here configured as a clamping holder which grips the base body 13 of the stator 3 in the radial direction. The holder 25 is fixed to support structure 4 via a centering clamping system 26, here in the form of a zero point clamping system. The centering clamping system 26 allows the holder 25 with the stator 3 to be fastened on the support structure 4 quickly and precisely.

The welding mask 5 is in the closed state in FIG. 3. The fingers 12 protrude between the bar conductors 2 and engage below the radially inner cover element 11. The free ends 2a of the bar conductors 2 are accessible from the first side 9 for welding.

The base body 13 of the stator 3 is arranged below the welding mask 5 on a second side 14 of the welding mask 5. The second side 14 is here located opposite the first side 9 on the welding mask 5. The first and second sides 9, 14 point in opposite directions.

The holder 25 is also on the second side 14 of the welding mask 5. Thus the holder 25 is also protected from contamination, e.g. from weld spatter, during welding of the free ends 2a.

Figure 4A:
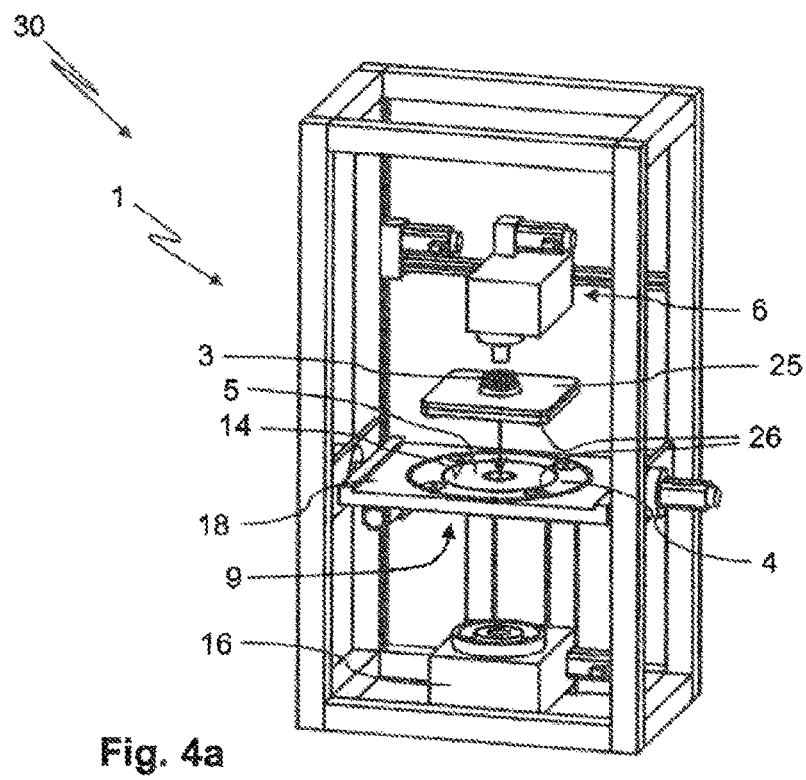
FIG. 4a a schematic perspective view of a production system with a welding machine as shown in FIG. 1 and a holder in which a stator with bar conductors is received, wherein a support structure for the holder is in the loading position so that the holder with the stator can be fixed to the support structure from above.
Figure 4B:
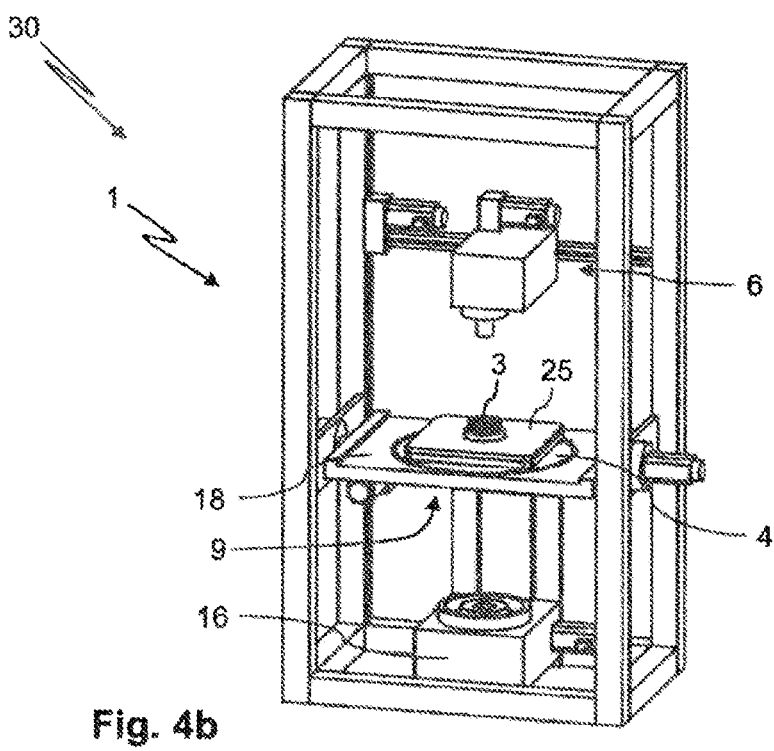
FIG. 4b a schematic perspective view of the production system from FIG. 4a with the stator fixed to the support structure by means of the holder, wherein the support structure is in the loading position.
Figure 4C:
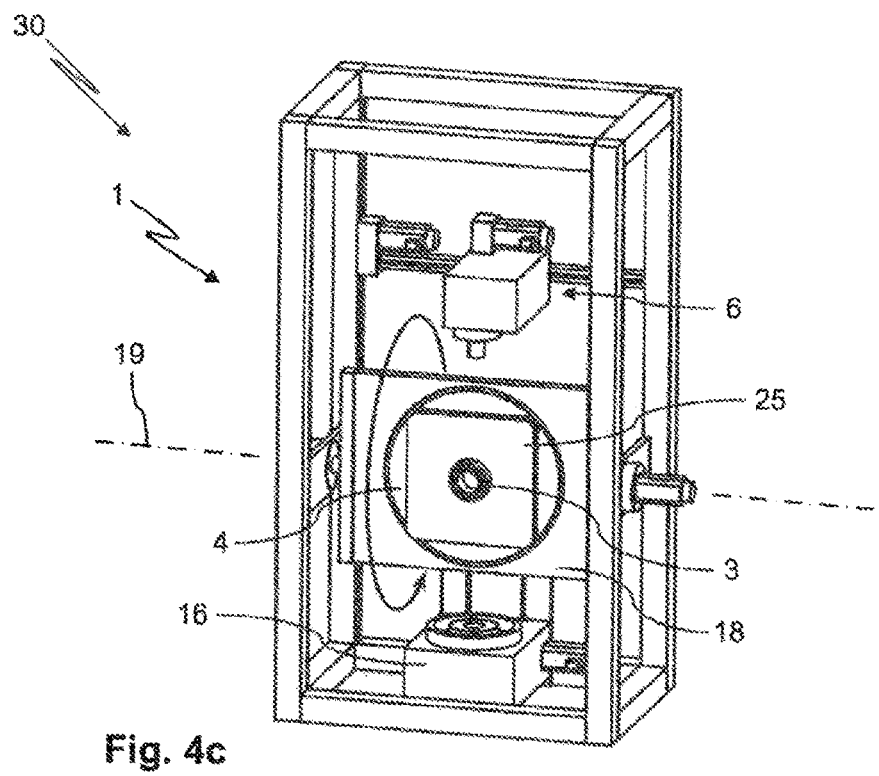
FIG. 4c a schematic perspective view of the production system from FIG. 4a during transfer of the support structure into the welding position.
Figure 4D:
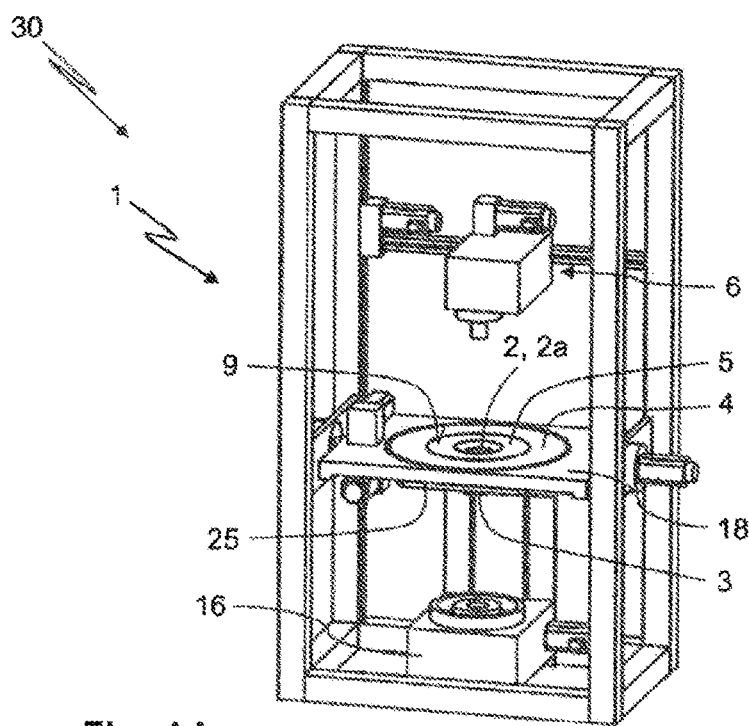
FIG. 4d a schematic perspective view of the production system from FIG. 4a with the support structure in the welding position.
Figure 4E:
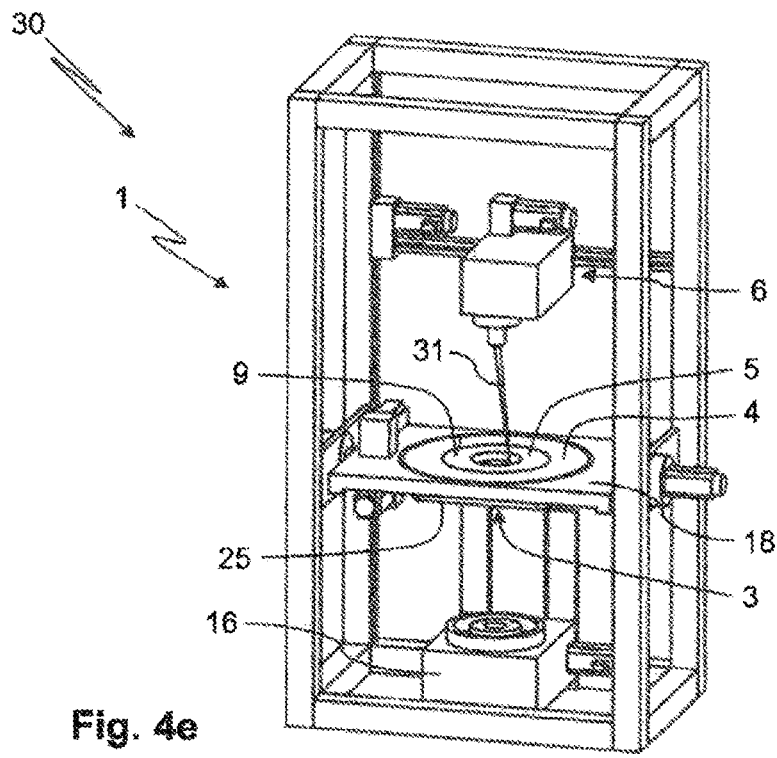
FIG. 4e a schematic perspective view of the production system from FIG. 4a during welding of the free ends of bar conductors of the stator.
Figure 4F:
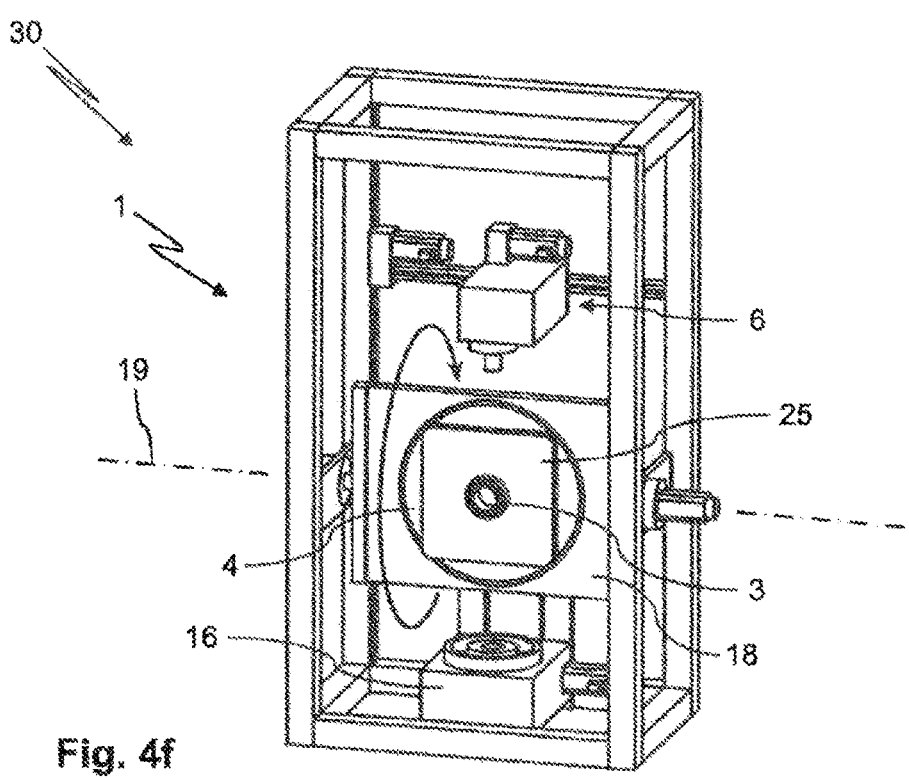
FIG. 4f a schematic perspective view of the production system from FIG. 4a during transfer of the support structure from the welding position to the loading position.
Figure 4G:
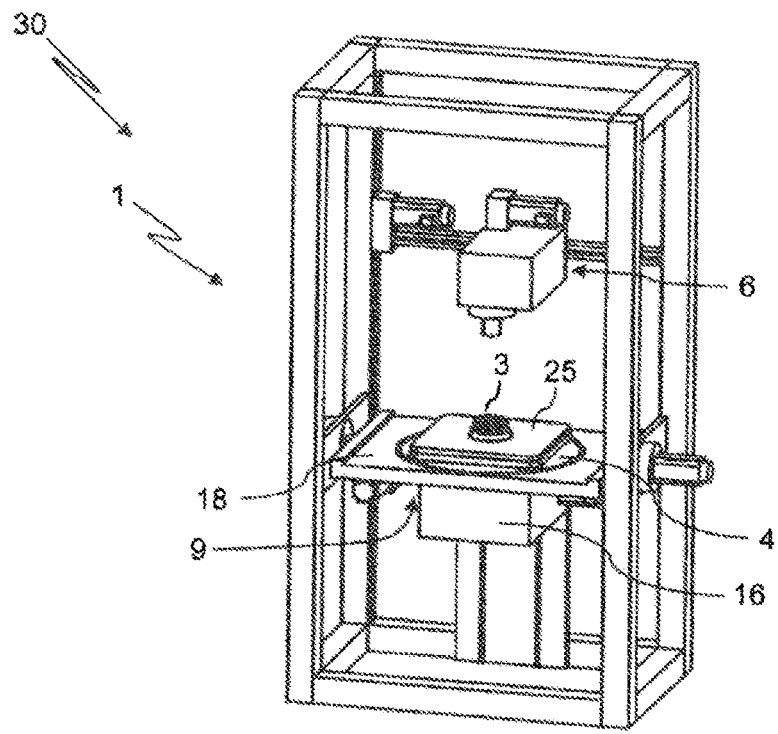
FIG. 4g a schematic perspective view of the production system from FIG. 4a with the support structure in the loading position, wherein a cleaning device for cleaning the welding mask has been brought up to said support structure.
Figure 4H:
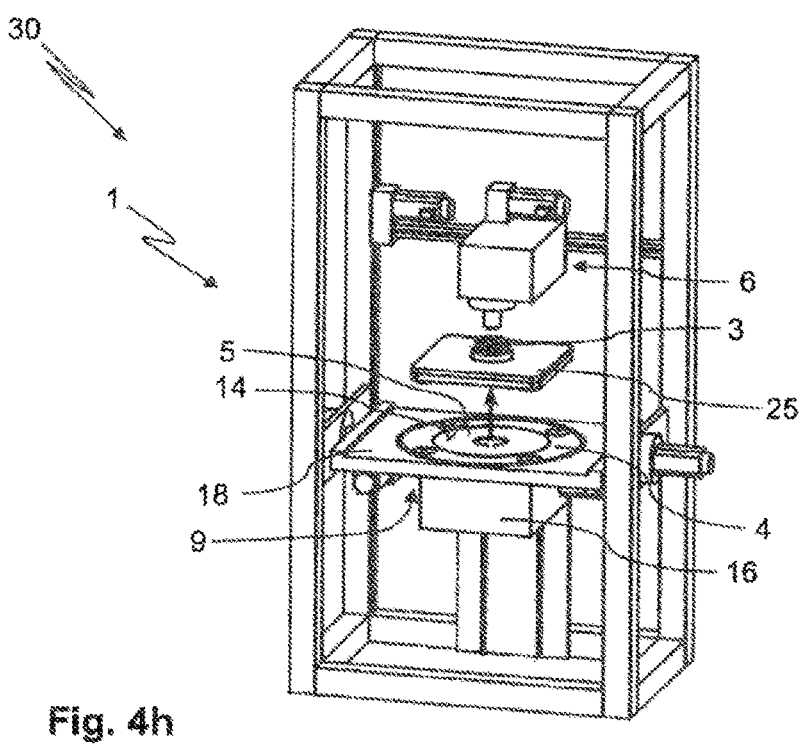
FIG. 4h a schematic perspective view of the production system from FIG. 4a during removal of the stator from the support structure which is in the loading position.
Figure 5:
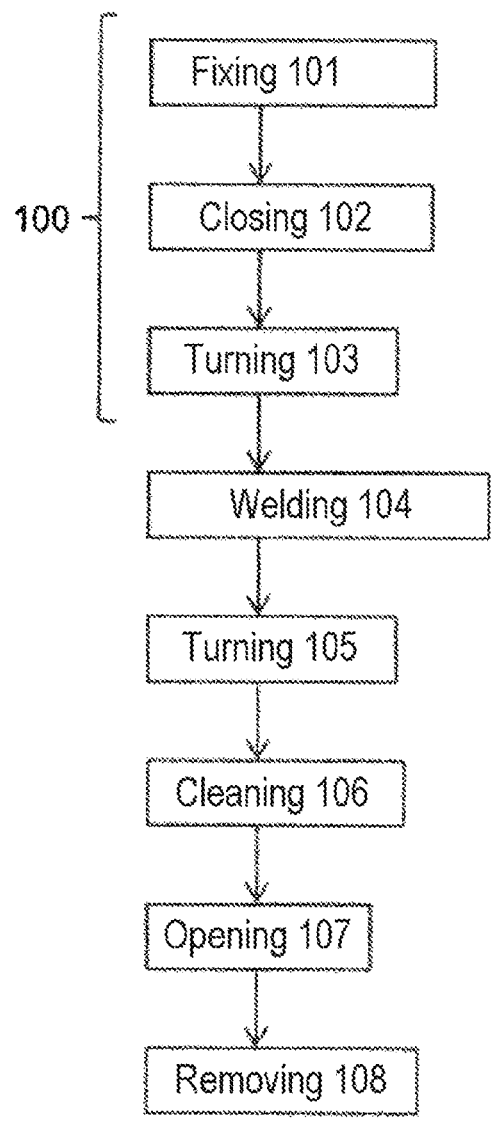
FIG. 5 a flowchart of a method for welding free ends of bar conductors.

FIGS. 4a-4h show a production system 30 with a welding machine 1 (see FIG. 1) and a holder 25 (see FIG. 3) on which a stator 3 (see FIG. 2d) is held, at various times during performance of a welding process, the sequence of which is depicted schematically in FIG. 5.

In FIG. 4a, the support structure 4 is in the loading position, wherein the first side 9 points downward (towards the cleaning device 16). While the support structure 4 is in the loading position, in a step 101, the holder 25 with the stator 3 is fixed to the support structure 4 by means of the centering clamping system 26. The free ends 2a of the bar conductors 2 (see FIG. 2d) also point downward. The holder 25 is arranged on the second side 14 of the welding mask 5. During fixing of the stator 3 to the support structure 4, the welding mask 5 is open.

The production system 30 with stator 3 fixed indirectly to the support structure 4 via the holder 25, is shown in FIG. 4b. Now in a step 102, the welding mask 5 can be closed. In doing so, the support structure 4 is still in the loading position.

Then in a step 103, the support structure 4 is turned. For this, the swivel bridge 18 is rotated about the horizontal pivot axis 19. This is shown in FIG. 4c. After completion of step 103, the support structure 4 is in the welding position as shown in FIG. 4d. The first side 9 of the support structure 4 and the free ends 2a of the bar conductors 2 now point upward towards the welding device.

Steps 101, 102 and 103 together act as a common step 100 which provides a stator 3 fixed to the support structure 4, wherein the free ends 2a of the bar conductors 2 and the first side 9 of the support structure 4 point upward, and wherein the welding mask 5 is closed.

Then in a step 104, the free ends 2a of the bar conductors 2 are welded. This is indicated in FIG. 4e by the laser beam 31, depicted in highly abstract form, which is emitted by the welding device 6 configured as a laser welding device. The laser beam 31 is in practice usually focused on the free ends to be welded. It is noted that, typically, the free ends 2a are welded successively in pairs; for this, the support structure 4 may be rotated about a vertical rotational axis (not shown in detail, see FIGS. 1 and 2a). The support structure 4 with stator 3 fixed thereto remains in the welding position throughout this process.

After completion of the welding, the support structure 4 is again turned in a step 105 in order to transfer it to the loading position. For this, the welding bridge 18 is rotated about the horizontal pivot axis 19, see FIG. 4f.

When the support structure 4 is in the loading position, i.e. the first side 9 and the welded ends 2a of the bar conductors 2 point downward, a cleaning process is performed in a step 106. For this, the cleaning device 16 is brought up to the welding mask 5 from below, see FIG. 4g. The cleaning device 16 removes dirt such as weld spatter from the first side 9 of the welding mask 5 (concealed in FIG. 4g), and from the now welded free ends 2a (also concealed in FIG. 4g) of the bar conductors 2. Dirt particles detached during cleaning fall downward under the effect of gravity, so that they can be collected in the cleaning device 16.

After completion of the cleaning process, in a step 107, the welding mask 5 is opened. Then the holder 25 with the stator 3 is removed from the support structure 4 in a step 108, see FIG. 4h, in that the holder 25 is pulled upward from the support structure 4.

The free ends of the bar conductors of a further stator may now be welded in the manner described. The support structure 4 may remain in the last established loading position for fixing of the further stator. Typically, the cleaning device 16 is again removed downward from the swivel bridge 18 before fixing of the further stator.

LIST OF REFERENCE SIGNS

Welding machine 1
Free ends 2a
Bar conductor 2
Stator 3
Support structure 4
Welding mask 5
Welding device 6
First side 9
Radially outer cover element 10
Radially inner cover element 11
Finger 12
Base body 13
Second side 14
Cleaning device 16
Frame 17
Swivel bridge 18
Pivot axis 19
Vertical direction 20
Horizontal direction 21
Rotational axis 22
Vertical drive 23
Horizontal drive 24
Holder 25
Centering clamping system 26
Vertical direction 27
Rotational drive 28
Production system 30
Laser beam 31
Providing 100
Fixing 101 the stator 3 to the support structure 4
Closing 102 the welding mask 5
Turning 103 the support structure 4 (loading position->welding position)
Welding 104 the free ends 2a
Turning 105 the support structure 4 (welding position->loading position)
Cleaning 106
Opening 107 the welding mask 5
Removing 108 the stator 3 from the support structure 4

What is claimed is:

1. A welding machine configured for welding free ends of bar conductors of a stator for use in an electrical machine or an electric motor, the welding machine comprising:
   a support structure for directly or indirectly fixing the stator, having a welding mask which can be opened and closed, wherein the welding mask is configured to isolate all the free ends of the bar conductors protruding on a first side of the welding mask from a stator body, which stator body is concealed behind a second side of the welding mask in a closed state, the second side of the welding mask being opposite the first side of the welding mask;
   a welding device;
   wherein the welding device is arranged above the support structure; and
   wherein the support structure can be moved between a welding position and a loading position, wherein the first side of the welding mask is oriented towards the welding device in the welding position and is oriented downward in the loading position.

2. The welding machine as claimed in claim 1, wherein the welding mask is configured to clamp the free ends of the bar conductors in the closed state.

3. The welding machine as claimed in claim 1, wherein the welding mask has movable fingers configured for engaging between the bar conductors, wherein in the closed state the movable fingers cover all regions between adjacent and radially running rows of the free ends of the bar conductors.

4. The welding machine as claimed in claim 1, wherein the welding machine furthermore has a cleaning device configured for cleaning the welding mask or the first side of the welding mask.

5. The welding machine as claimed in claim 4, wherein the cleaning device is arranged below the support structure.

6. The welding machine as claimed in claim 5, wherein the cleaning device is configured for cleaning by blowing, scraping, brushing and/or blasting, wherein the blasting is CO2 snow blasting.

7. The welding machine as claimed in claim 1, wherein the welding machine has a frame on which the support structure is mounted via a swing bridge.

8. The welding machine as claimed in claim 7, wherein the frame is a rectangular frame.

9. The welding machine as claimed in claim 1, wherein the support structure is rotatable about a horizontal pivot axis.

10. The welding machine as claimed in claim 9, wherein the support structure is rotatable about a rotational axis oriented perpendicularly to the pivot axis.

11. The welding machine as claimed in claim 1, wherein the welding device can travel in a vertical direction and at least one horizontal direction relative to the support structure.

12. The welding machine as claimed in claim 1, wherein the welding device is a laser welding device.

13. A production system comprising the welding machine as claimed in claim 1 and a holder by means of which the stator can be fixed to the support structure.

14. The production system as claimed in claim 13, wherein the holder is connected to the support structure via a centering clamping system.

15. The production system as claimed in claim 14, wherein the centering clamping system is a zero point clamping system.

16. The production system as claimed in claim 13, wherein the holder is a clamping holder.

* * * * *